(12) United States Patent
Chopra

(10) Patent No.: US 9,141,440 B2
(45) Date of Patent: Sep. 22, 2015

(54) FAULT TOLERANT DISTRIBUTED LOCK MANAGER

(75) Inventor: Rajat Chopra, Sunnyvale, CA (US)

(73) Assignee: Red Hat, Inc., Raleigh, NC (US)

(*) Notice: Subject to any disclaimer, the term of this patent is extended or adjusted under 35 U.S.C. 154(b) by 98 days.

(21) Appl. No.: 13/340,431

(22) Filed: Dec. 29, 2011

(65) Prior Publication Data

US 2013/0174165 A1  Jul. 4, 2013

(51) Int. Cl.
| | |
|---|---|
| G06F 9/46 | (2006.01) |
| G06F 13/00 | (2006.01) |
| G06F 11/00 | (2006.01) |
| G06F 9/52 | (2006.01) |
| G06F 11/07 | (2006.01) |
| G06F 17/30 | (2006.01) |
| G06F 11/14 | (2006.01) |

(52) U.S. Cl.
CPC ............ *G06F 9/526* (2013.01); *G06F 11/0757* (2013.01); *G06F 11/1482* (2013.01); *G06F 11/1438* (2013.01); *G06F 17/30362* (2013.01); *G06F 2201/825* (2013.01); *G06F 2209/522* (2013.01)

(58) Field of Classification Search
USPC ........................................................ 718/102
See application file for complete search history.

(56) References Cited

U.S. PATENT DOCUMENTS

| | | | | |
|---|---|---|---|---|
| 6,665,814 | B2 * | 12/2003 | Hobson et al. | 714/16 |
| 7,313,557 | B1 * | 12/2007 | Noveck | 1/1 |
| 8,458,517 | B1 * | 6/2013 | Vermeulen et al. | 714/15 |
| 2003/0225884 | A1 * | 12/2003 | Hayden | 709/226 |
| 2006/0253856 | A1 * | 11/2006 | Hu et al. | 718/104 |
| 2006/0274372 | A1 * | 12/2006 | Qutub et al. | 358/1.16 |
| 2008/0243850 | A1 * | 10/2008 | Michael et al. | 707/8 |
| 2009/0320120 | A1 * | 12/2009 | Osborne et al. | 726/12 |
| 2010/0100890 | A1 * | 4/2010 | Dar et al. | 719/314 |
| 2010/0180146 | A1 * | 7/2010 | Rousseau et al. | 714/2 |
| 2011/0296069 | A1 * | 12/2011 | Tarta et al. | 710/200 |
| 2012/0239812 | A1 * | 9/2012 | Gargash et al. | 709/226 |
| 2012/0272239 | A1 * | 10/2012 | Kalle et al. | 718/1 |

OTHER PUBLICATIONS

Lamport, Leslie, "A New Solution of Dijkstra's Concurrent Programming Problem," Communications of the ACM, Aug. 1974, vol. 17, No. 8, pp. 453-455.

* cited by examiner

*Primary Examiner* — Abdullah Al Kawsar
(74) *Attorney, Agent, or Firm* — Lowenstein Sandler LLP

(57) ABSTRACT

A lock manager running on a machine may write a first entry for a first process to a queue associated with a resource. If the first entry is not at a front of the queue, the lock manager identifies a second entry that is at the front of the queue, and determines whether a second process associated with the second entry is operational. If the second process is not operational, the lock manager removes the second entry from the queue. Additionally, if the queue becomes unavailable, the lock manager may initiate failover to a backup copy of the queue.

18 Claims, 7 Drawing Sheets

FAULT TOLERANT DISTRIBUTED LOCK MANAGER

TECHNICAL FIELD

Embodiments of the present invention relate to locking resources in a distributed computing system, and more particularly to a distributed lock manager that is fault tolerant.

BACKGROUND

In distributed computing systems, it is beneficial to provide software applications with synchronized access to shared resources. To provide such synchronized access to shared resources, some distributed computing systems include a locking mechanism. However, conventional locking mechanisms typically lack fault tolerance. Accordingly, in such locking mechanisms, if a process that holds a lock to a resource crashes or if a lock order is lost, then the system may stall. One example of a distributed locking mechanism is a locking mechanism that implements the Lamport's Bakery Algorithm, which is described in "A New Solution of Dijkstra's Concurrent Programming Problem," by Leslie Lamport in Communications of the ACM, August 1974, Volume 17, Number 8, pages 453-455. However, as with other conventional locking mechanisms, the bakery algorithm lacks fault tolerance.

BRIEF DESCRIPTION OF THE DRAWINGS

Embodiments of the present invention are illustrated by way of example, and not by way of limitation, and can be more fully understood with reference to the following detailed description when considered in connection with the figures in which.

DETAILED DESCRIPTION

Described herein are methods and systems for a fault tolerant locking mechanism usable in a distributed computing environment. The fault tolerant locking mechanism may include a fault tolerant queue that has multiple coherent and concurrent copies, and may additionally or alternatively include a policing mechanism in which lock managers can remove entries from the queue and/or withdraw locks to processes.

In one embodiment, a lock manager running on a machine receives a request from a first process for a resource, wherein the machine is a node in a distributed system. If no queue has been generated for the resource, the lock manager generates a queue for the resource. Multiple copies of the queue may be created. These copies may be hosted by different machines arranged in a cluster. If a machine storing the queue crashes or otherwise becomes unavailable, the lock manager may fail over the queue to a backup copy.

A process having an entry at a front of the queue is permitted to perform an action associated with the resource. The lock manager writes a first entry for the first process to the queue. If the first entry is not at the front of the queue, the lock manager determines whether a second process associated with a second entry at the front of the queue is operational. In response to determining that the second process is not operational, the lock manager removes the second entry from the queue. If the entry associated with the first process advances to the front of the queue, then the first process is permitted to perform an action associated with the resource. Examples of such actions include obtaining a lock on the resource (e.g., if the resource is data) and executing an operation (e.g., where the resource is an operation).

Embodiments of the present invention provide a fault tolerant distributed locking mechanism. Accordingly, applications running in a distributed computing system may implement embodiments of the present invention to maintain synchronized access to shared resources even in the event of device failures, application failures, network partitions, and so forth. Additionally, lock managers described in embodiments of the present invention can be used when there is an unknown number of participant nodes and/or processes, enabling a distributed computing system to be elastic (e.g., where nodes and processes can be added or removed dynamically). Moreover, lock managers described herein can manage access to shared resources even in instances in which the lock managers and/or other processes communicate via shared memory without use of any dedicated mechanisms such as semaphores, atomic set-and-test mechanisms, and so on.

Figure 1:
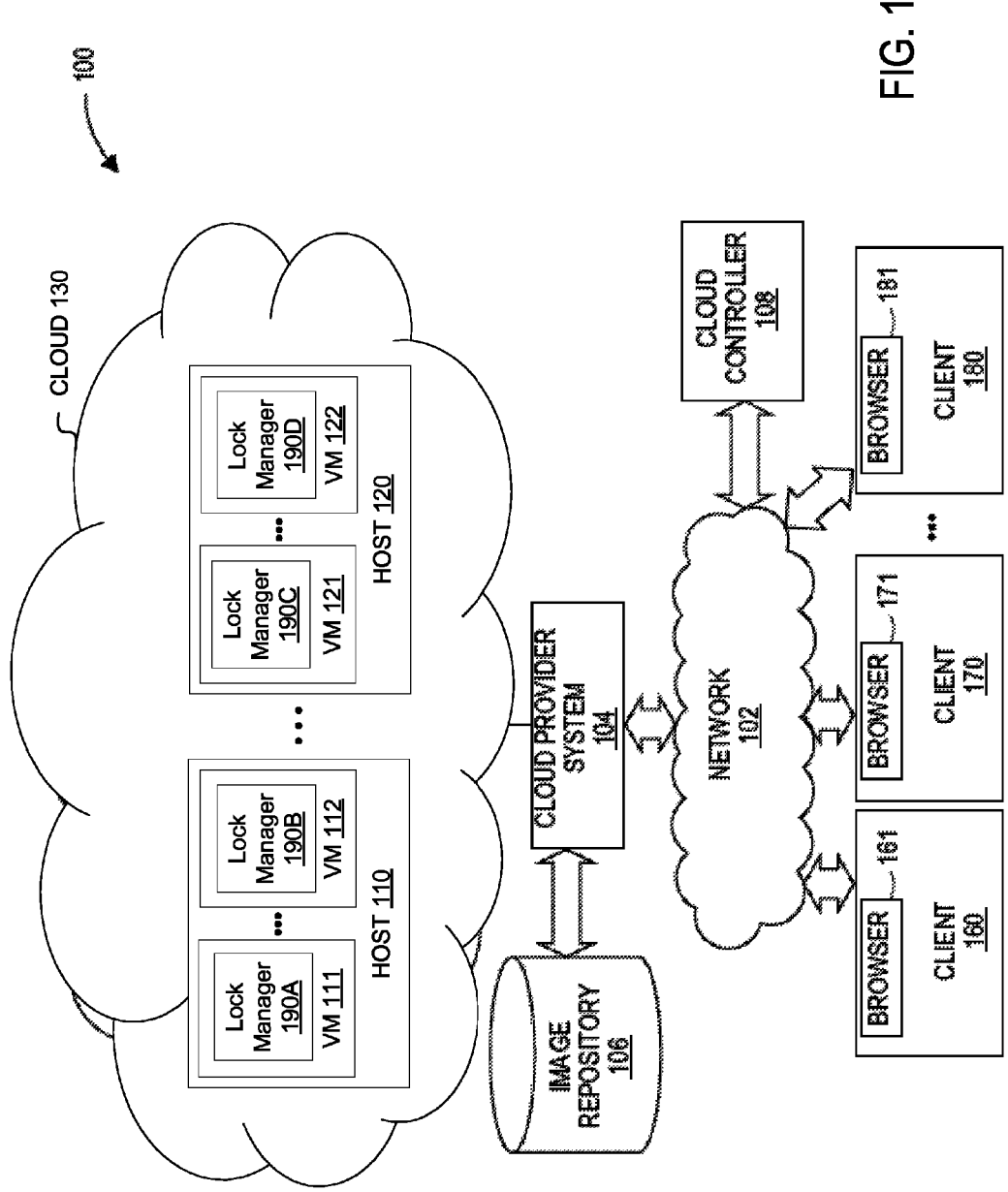
FIG. 1 is a block diagram of a distributed network architecture, in which embodiments of the invention may operate.

FIG. 1 is a block diagram of a network architecture 100 for a distributed computing system, in which embodiments of the invention may operate. The network architecture 100 includes a cloud 130 managed by a cloud provider system 104. The cloud 130 provides virtual machines, such as virtual machines 111, 112, 121, and 122. Each virtual machine is hosted on a physical machine configured as part of the cloud 130. Such physical machines are often located in a data center. For example, virtual machines 111 and 112 are hosted on physical machine 110 in cloud 130 provided by cloud provider 104. The cloud provider system 104 and cloud 130 may be provided as an infrastructure as a service (IaaS) layer. The cloud provider system 104 and cloud 130 may be provided by, for example, Amazon's® Elastic Compute Cloud (EC2®). Users can interact with applications executing on cloud-based virtual machines using client computer systems, such as clients 160, 170 and 180, via corresponding web browser programs 161, 171 and 181.

Clients 160, 170 and 180 are connected to hosts 110, 120 and the cloud provider system 104 via a network 102, which may be may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 via the network 102. The cloud controller 108 may reside on one or more machines (e.g., server computers, desktop computers, etc.) and may manage the execution of applications in the cloud 130. In one embodiment, the cloud controller 108 provides platform packages associated with different applications to the cloud provider 104. A platform package is a pre-generated image that can be provided to the cloud provider 104 and stored in an image repository 106. This image may be a virtual machine image or an image of a physical system. Upon receiving a command identifying a specific platform package, the cloud provider 104 retrieves the corresponding image from the image repository 106, creates an instance of it and loads it on the host 110, 120 to run on top of a hypervisor (not shown). The command may be received from the cloud controller 108 or a user (e.g., a system administrator) via a console computer or a client machine. The image repository 106 may reside locally or remotely and may represent a single data structure or multiple data structures (databases, repositories, files, etc.) residing on one or more mass storage devices, such as magnetic or optical storage based disks, solid-state drives (SSDs) or hard drives.

The image repository 106 may also store application packages and/or support component packages, which may be loaded onto a host and run on a hypervisor in a similar manner as the platform packages. The cloud provider 104 or the cloud controller 108 may also load an application package on the host 110, 120 to run on top of the platform package or on top of a component package. Additionally, application packages and/or component packages may be stored in one or more other repositories (not shown) residing locally or remotely instead of, or in addition to, the image repository 106.

One example of support component packages are cartridges. Cartridges are component packages that include one or multiple support components along with additional information identifying abstract features provided by the support components. Cartridges may share a similar construction, such that cartridges can be loaded and unloaded from the platform core during execution in accordance with needs of an application or other installed components.

It may be beneficial to provide processes of the distributed computing system with a mechanism for synchronizing their access to shared resources. The shared resources may be entities, operations, and/or data structures to which shared access is to be controlled. Resources may include data such as a file, a record (e.g., in a table or database), an entire database or table, a column or row of a database or table, an area of shared memory, and so on. Resources may also include, for example, operations that may be executed by various different processes.

In one embodiment, the platform included in the virtual machines 111, 112, 121, 122 includes lock managers 190A, 190B, 190C, 190D. The lock managers 190A, 190B, 190C, 190D are responsible for providing synchronized access to shared resources. Lock managers 190A, 190B, 190C, 190D may coordinate with one another to determine processes that are to be given locks to data and/or to determine processes that are to perform operations. Lock managers 190A, 190B, 190C, 190D are discussed in greater detail below with reference to FIG. 3.

Figure 2:
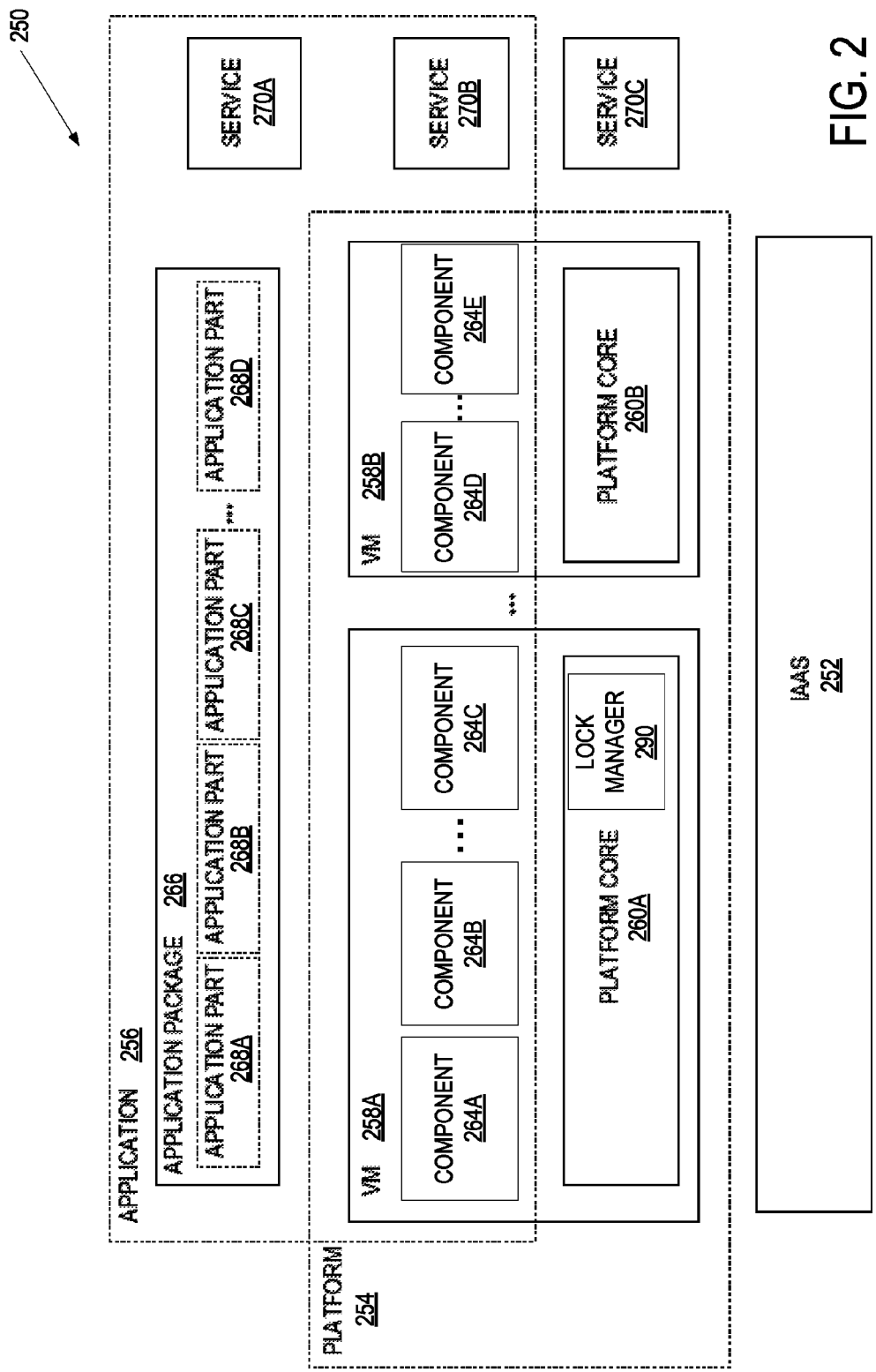
FIG. 2 is a block diagram of one embodiment of a Platform-as-a-Service (PaaS) approach for facilitating the execution of a web application in a cloud.

FIG. 2 is a block diagram of one embodiment of a Platform-as-a-Service (PaaS) environment 250 for facilitating the execution of a web application (or other application) in a cloud. The PaaS environment 250 includes an Infrastructure-as-a-Service (IaaS) 252, which consists of hardware (e.g., one or more processors, memory, TO devices, etc.) and a hypervisor, and a platform 254 running on the IaaS 252. The platform 254 may be delivered as an auto-clustering virtual machine image (or multiple different auto-clustering virtual machine images), resulting in one or more virtual machines 258A, 258B, each containing a platform core 260A 260B and a one or more components 264A, 264B, 264C, 264D, 264E. Each VM 258A, 258B may be a node of the platform 254.

The platform core 260A, 260B provides a framework that enables components 264A-264E and application parts 268A-268D to communicate with one another, and that enables VMs 258A, 258B (nodes) to communicate with (and form clusters with) other VMs 258A, 258B. The platform core 260A, 260B also includes functionality for managing the application 256 and components 264A-264E, for managing synchronized access to shared resources, and for scaling the numbers and types of nodes. The platform core 260A, 260B may include a guest OS with a kernel, distributed services, a data transport, data services, monitors and/or other functionality. Distributed services allow communication between nodes when the application runs on multiple nodes arranged in a cluster executing on one or more hypervisors in one or more hosts. Each node may include a separate instance of the platform 254, or may include a different subset of the platform (e.g., a specific component or components of the platform).

The monitors of the platform core 260A, 260B may receive monitoring data from the guest OS and kernel, and pass it to the data services that store this data in a data store inside the platform 254 and allows querying of this data by the user(s) and/or client(s). The monitoring data may describe the behavior and measure the performance of components 264A-264E, elements of hardware and the application 256. Additionally, the monitoring data may be used to identify the state of components 264A-264E, virtual machines 258A-258B, applications 256, application packages 266, application parts 268A-168D, services 270A-270C and so on. The data transport communicates data between different components 264A-264E of the platform 254 and between different platforms when applicable.

The components 264A-264E form a layer (or multiple layers) that provides a variety of middleware, framework and other support software for the application 256. Components 264A-264E may each provide support functionality used by the application 256 and/or by other components 264A-264E. Examples of components 264A-264E include a Java® component, a Tomcat® component, an Apache® component, a JBoss® component, a PHP® component and a MySQL® component. However, many other types of components are also possible. Each component 264A-264E provides specific capabilities. Application 256 may identify specific capabilities that application 256 uses to run. Those components 264A-264E that provide the specified capabilities may be loaded in the platform 254. Additionally, some of the components 264A-264E may specify additional capabilities that those components rely upon. If any such components 264A-264E will be loaded into platform 254, then the additional components that provide the capabilities that those components rely upon may also be loaded into the platform 254. The components 264A-264E can issue commands to request system information such as information about the architecture and packages installed, and can further communicate with the platform via communication channels such as the file system, interprocess communication (IPC), and a network.

In one embodiment, at least some components 264A-264E are provided by cartridges (not shown). Cartridges are software packages that provide functionality of one or more components 264A-264E. Components may also be built into the platform 254 and/or may be included in an application package 266.

Application 256 includes an application package 266 containing multiple application parts 268A-268D which may correspond to different individually deployable modules of the application. For example, a first application part 268A may include application code or logic, and another application part 268B may include static data that will be farmed out to a content delivery network. Application 256 may be an n-tiered web application based on languages such as Java, Ruby, Python, PHP or the like. The PaaS environment 250 may also include external services 270A-270C on which the application 256 depends.

An application package 266 may be provided by a user or created automatically based on information about the application that is provided by a user via a user interface or by other means. The platform core 260A, 260B and components 264A-264E may be provided by the PaaS provider. Components 264A-264E are not typically packaged with the application 256. Instead, the application package 266 typically expresses a dependency on platform services provided by components 264A-264E. The platform 254 may then import the appropriate components 264A-264E at deployment time.

In one embodiment, each VM 258A-258B includes the same platform instance and an instance of the application 256. Accordingly, each machine runs an instance of all components provided by the platform. In another embodiment, different VMs include distinct platform instances. For example, a first platform instance may include a Java component and host the application package 266, and a second platform instance may include a MySQL component. Nodes that include the first platform instance may be grouped into a first cluster, and nodes that include the second platform instance may be grouped into a second cluster.

In one embodiment, the platform core 260A, 260B includes a lock manger 290. The lock manager 290 may manage locks on shared resources for components 264A-264E, applications 256, application parts 268A-268D, etc. running on a VM 258A, 258B with the lock manager 290. The lock manager 290 may coordinate with other lock managers 290 running on other nodes (e.g., in other VMs 258A, 258B) to determine a process order, and may maintain this process order in a queue. Processes at a front of the queue may be granted locks to specified resource. The lock managers 290 may also monitor a process to which a lock has been granted to ensure that the process has not crashed, stalled or otherwise become nonoperational. The lock manager 290 may use the monitoring data to determine whether a process has become nonoperational. The lock manager 290 may alternatively or additionally make such determinations based on an amount of time that a lock has been assigned to a process. In addition, in the event that the queue becomes unavailable, the lock manager 290 may communicate with other lock managers running on the other nodes to elect a backup queue to fail over to. The lock manager 290 is discussed in greater detail below with reference to FIG. 3.

Figure 3:
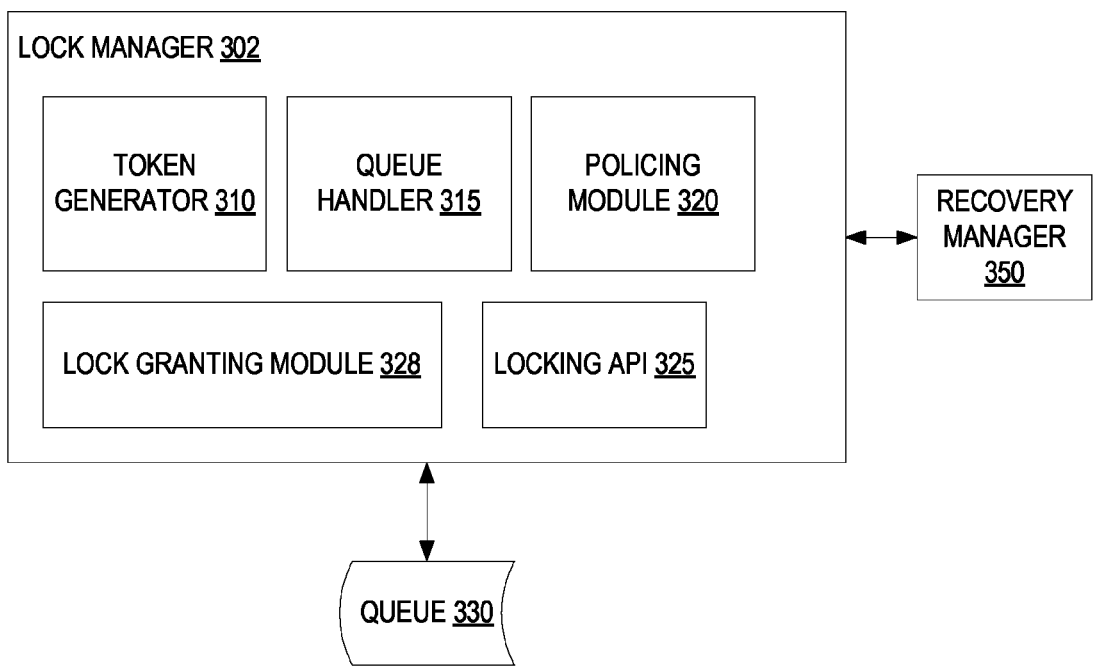
FIG. 3 illustrates a block diagram of a lock manager, in accordance with one embodiment of the present invention.

FIG. 3 illustrates a block diagram of a lock manager 302, in accordance with one embodiment of the present invention. Lock manager 302 may correspond to a lock manager 190 of FIG. 1 and/or a lock manager 290 of FIG. 2. In one embodiment, lock manager 302 includes a token generator 310, a queue handler 315 and a policing module 320 and a lock granting module 328. Lock manager 302 may also include a locking application programming interface (API) 325. Note that in alternative embodiments, one or more of the token generator 310, queue handler 315, policing module 320, lock granting module 328 and/or locking API 325 may be combined into a single module. Additionally, the functionality of any of the token generator 310, queue handler 315, policing module 320, lock granting module 328 and locking API 325 may be divided between multiple modules.

Lock manager 302 may be invoked in response to a process attempting or requesting to place a lock on, access or perform some other operation on a shared resource. Lock manager 302 may additionally be invoked in response to a process committing to perform an operation (e.g., an operation that affects multiple nodes that should not be run concurrently by multiple processes). The process may be a process or an execution thread of a process for an application part, a component, a platform core service, an external service, and so on. In one embodiment, the request is received based on the process calling the locking API 325, which may be exposed to applications and/or components. Therefore, any cartridge or application may be written by a third party that can invoke the lock manager 302 via the locking API 325 and thereby utilize the locking mechanisms provided by the lock manager 302.

In response to lock manager 302 receiving a request from a process for a shared resource, token generator 310 generates a lock token for the process. The generated lock token may include a timestamp indicating when the request was received and/or when the token was generated, a machine identifier (ID) uniquely identifying a machine (e.g., a virtual machine and/or underlying physical machine) on which the process runs, a process identifier (ID) uniquely identifying the process and/or a thread identifier (ID) identifying a particular thread of the process that requested the lock or operation. The lock token may also include a lock duration (an estimated time at which a granted lock will be released). In one embodiment, token generator 310 generates a unique hash based on the timestamp, duration, machine ID, process ID and/or thread ID. The hash may be included in the lock token.

Also in response to lock manager 302 receiving a request from a process for a shared resource, queue handler 315 determines whether a queue has been generated for that resource. If no queue has been generated for the resource, then queue handler 315 generates such a queue 330. Queue handler 315 then adds an entry including the lock token generated by token generator 310 to the queue 330. If lock manager 302 receives other requests from other processes for the same shared resource, then token generator 310 may generate additional lock tokens for those processes and queue handler 315 may add entries to the queue 330 with those additional lock tokens. Any other lock managers 302 may also receive requests for the shared resource. Lock tokens may be generated for each of those other requests and may be added to entries in the queue 330 by the other lock managers. Accordingly, the queue 330 may reflect all processes running on any nodes in a distributed computing system that attempt to access the same shared resource. Note that the lock manager may not have information that identifies how many processes will use locks (e.g., how many processes will be participating in the queue) prior to generating the queue. Moreover, new processes may be added to the queue and processes may be removed from the queue at any time. Therefore, membership of the queue may be variable.

Lock tokens are ordered in the queue 330 based on timestamps. Therefore, entries having earlier timestamps are preferably ordered at a front of the queue, and entries having later timestamps are preferably ordered at a back of the queue. Where two lock tokens have matching timestamps, order between these two lock tokens may be determined arbitrarily (e.g., based on location, lock duration, process ID, machine ID, hash, etc.).

In one embodiment, nodes on which the lock managers 302 execute have synchronized (or approximately synchronized) time clocks. This ensures that ordering in the queue is accurate. In one embodiment, the nodes synchronize to a network time protocol (NTP) server (e.g., when the nodes are initialized). In another embodiment, nodes use a virtual clock, vector clock and/or Lamport timestamps to maintain timing. Using such techniques, appropriate ordering may be maintained (e.g., to achieve first in first out ordering) without having synchronized clocks.

Queue handler 315 may continuously or periodically check the queue to determine whether an entry at the front of the queue is associated with any processes that are being handled by lock manager 302 (e.g., processes collocated with lock manager 302 and/or processes from which lock manager 302 received a request). In response to queue handler 315 determining that the entry at the front of the queue is associated with a process handled by lock manager 302, lock granting module 328 obtains a lock for that resource. If the resource is data (e.g., a table, record, database, field, shared memory, etc.), then other processes may be restricted from performing operations on the data while the lock is maintained. What operations are restricted may depend on a type of lock obtained. In one embodiment, lock granting module 328 obtains one or more of a null lock (merely indicates interest in resource), a concurrent read lock (indicates interest in reading a resource and enables other processes to read or update the resource, but disallows other processes from obtaining an exclusive lock), a concurrent write lock (indicates an interest in updating a resource and enables other processes to read or update the resource, but does not permit other processes to obtain an exclusive lock), a protected read lock (indicates an interest in reading a resource and permits other processes to read but not update the resource), a protected write lock (indicates an interest in updating a resource and permits other processes to read but not update the resource) and/or an exclusive lock (restricts all other processes from reading or updating a resource) on the shared resource for the process.

Once a process to which a lock is granted completes an operation on a shared resource, the process releases the lock. Lock manager 302 (or the process) additionally removes the entry for that process from the queue. A lock manager 302 may then grant a lock on that resource to a next process associated with the next entry that advances to a front of the queue.

Policing module 320 continuously or periodically checks to confirm whether the process associated with an entry at the front of the queue is operational. These checks may be performed by all or just some lock managers 302 in the distributed system. In one embodiment, policing module 320 determines whether a process is operational based on a determination of whether a lock duration (or operation duration) has been exceeded. Policing module 320 may make such a determination based on comparing a time at which the lock was granted (or operation was started) to the provided lock duration (or operation duration). If an amount of time has elapsed since the lock was granted (or operation was started) that is longer than the lock duration (or operation duration), policing module 320 may determine that the process is no longer operational. In another embodiment, policing module 320 accesses monitoring data associated with the process that has been gathered by a monitor. The monitoring data may indicate whether the process is still operational.

If policing module 320 determines that the process associated with the entry at the front of the queue is not operational, queue handler 315 removes that entry from the queue 330 and lock granting module 328 releases the lock. The lock may then be assigned to a process associate with a next entry in the queue.

In one embodiment, lock manager is connected to a recovery manager 350. Policing module 320 may notify recovery manager 350 that the process is not functioning properly. Recovery manager 350 may then determine whether a machine hosting the process has crashed, whether the process has crashed, whether a particular thread of the process has crashed, or whether some other fault has occurred. If the process or a thread has crashed, then recovery manager 350 may cause that process to restart and recover a state of the process on a same machine that it was previously operating on or on a different machine. If the machine that was hosting the process crashed, then recovery manager 350 may cause the process to be restarted and recovered on an alternative machine.

Note that resources may be arranged in a resource hierarchy. For example, a top level in a resource hierarchy may be a database, a second level may be a table, a third level may be a record, and a fourth level may be a field. Lock manager 302 may obtain locks for appropriate levels of resources in the hierarchy. For example, if a process will be updating a particular record, then lock granting module 328 may obtain a lock for just that record. However, if the process is making a global update to the database, then lock granting module 328 may grant a lock to the entire database.

In one embodiment, multiple synchronized copies of the queue 330 are maintained. Lock managers 302 running on different nodes may determine a copy of the queue 330 that will operate as a primary copy that all nodes will use based on election or polling. If that primary copy becomes unavailable (e.g., if a machine hosting the primary copy crashes), then a backup copy of the queue 330 may be designated as the primary copy (e.g., via election). The system can fail over to a backup queue automatically without any interruptions to executing processes. In one embodiment, the copies of the queue 330 are maintained in a distributed database. For example, the queue 330 may be maintained in an Apache® Casandra® database, in an HBase® database, in a Hadoop® database, and so on.

Figure 4:
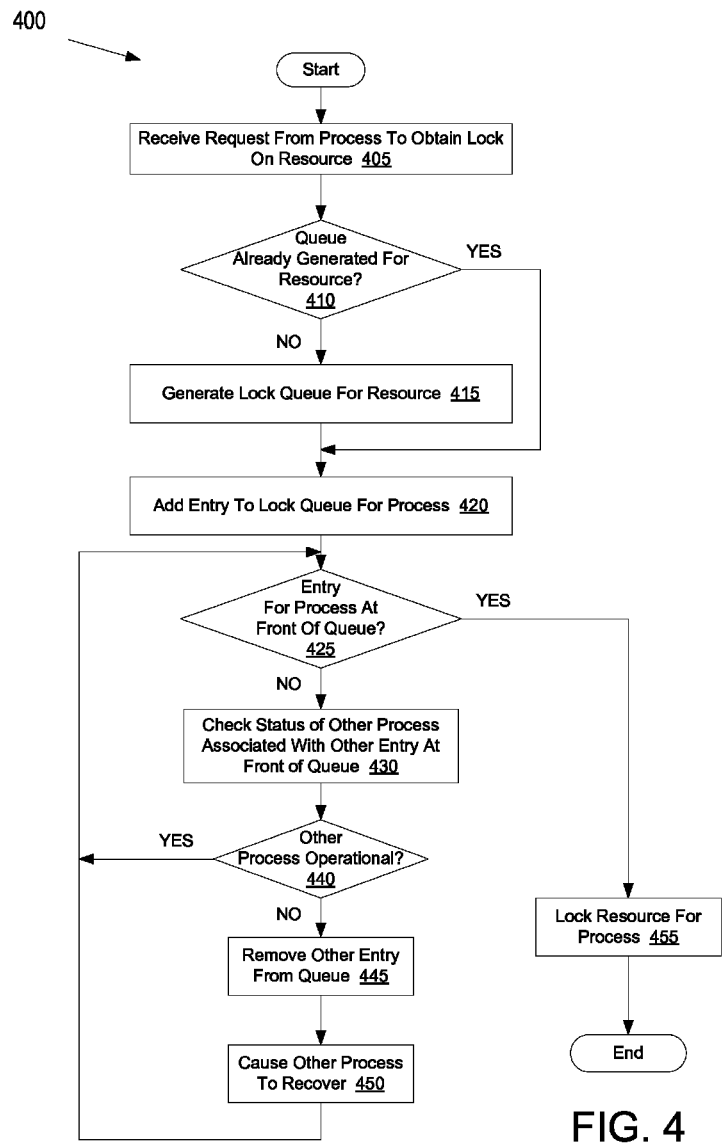
FIG. 4 is a flow diagram of one embodiment for a method of managing a fault tolerant lock queue.
Figure 5:
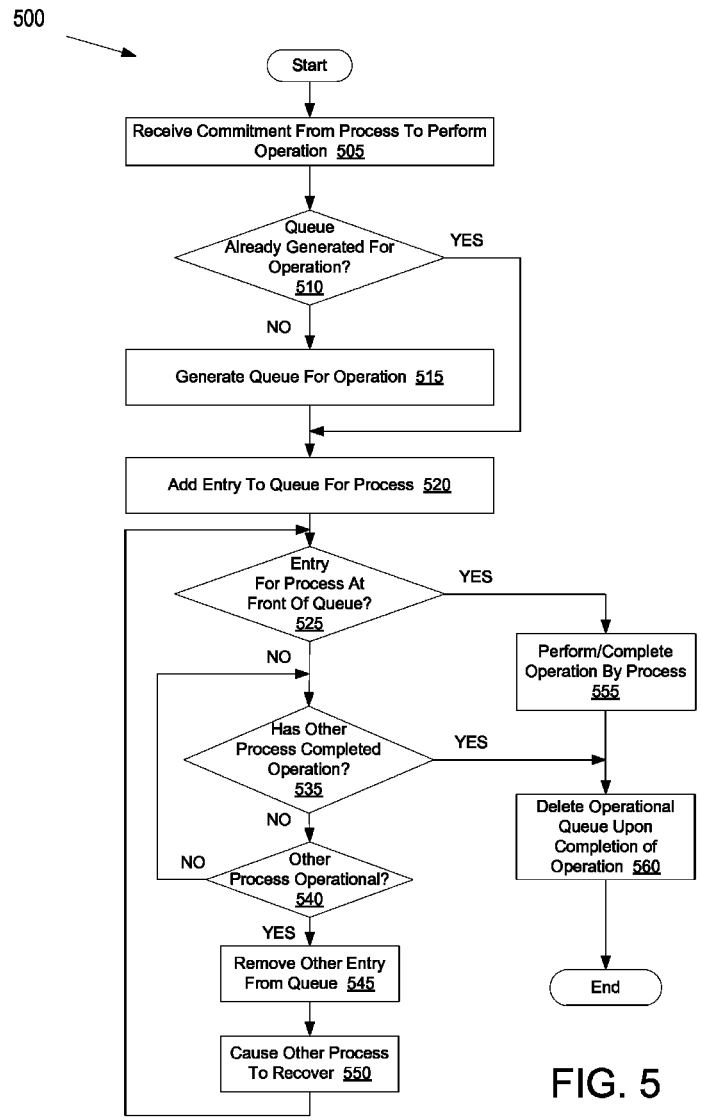
FIG. 5 is a flow diagram of one embodiment for a method of managing a fault tolerant operational queue.
Figure 6:
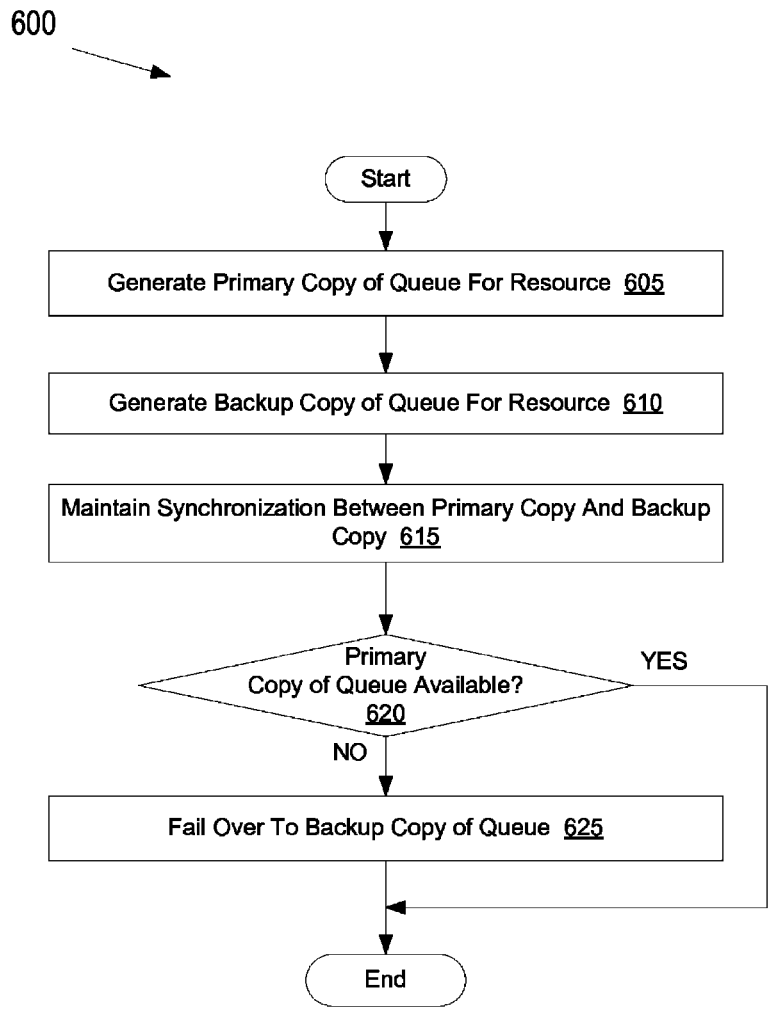
FIG. 6 is a flow diagram of one embodiment for a method of failing over a queue for a resource.

FIGS. 4-6 are flow diagrams of various embodiments of methods for managing synchronized access to shared resources in a distributed computing system. The methods are performed by processing logic that may comprise hardware (circuitry, dedicated logic, etc.), software (such as is run on a general purpose computer system or a dedicated machine), or a combination of both. In one embodiment, the methods are performed by the platform 254 running on a host machine, and in particular by a lock manager 290 of a platform core 260 within the platform 254.

FIG. 4 is a flow diagram of one embodiment for a method 400 of managing a fault tolerant lock queue. The lock queue may be for a data resource such as a database, table, record, field, shared memory, etc. A process having an entry at a front of the queue may be granted a lock to the data resource.

At block 405 of method 400, processing logic receives a request to obtain a lock on a resource (e.g., a data resource). The request may be received from a process. In one embodiment, the process attempts to perform an operation on the resource (e.g., read the resource, update the resource, etc.), and in response a request is automatically sent to the processing logic. In another embodiment, the process invokes the processing logic (e.g., via a locking API) and expressly requests a lock on the resource.

At block 410, processing logic determines whether a queue has already been created for the resource. The queue may be a lock queue that enables a process at a front of the queue to obtain a lock on the resource. The queue may already have been generated for the resource if another process previously requested a lock on the resource. If there is a preexisting queue for the resource, the method proceeds to block 420.

Otherwise, the method continues to block 415, and processing logic generates a lock queue for the resource.

At block 420, processing logic adds an entry to the lock queue for the process. The entry may be a lock token that includes a machine ID of a machine on which the process runs, a process ID of the process and/or a thread ID of a particular thread of the process that requested the lock. The machine ID, process ID and/or thread ID may be used to generate a hash that uniquely identifies the process. The lock token may additionally include a timestamp and a lock duration. The timestamp identifies when the process requested the lock and the lock duration identifies how long the process will hold the lock to the resource.

At block 425, processing logic determines whether the entry for the process is at a front of the lock queue. If the entry is at the front of the lock queue, the method continues to block 455, and processing logic obtains a lock to the resource for the process. If the entry for the process is not at the front of the queue, the method continues to block 430.

At block 430, processing logic checks a status of another process that is associated with another entry that is at the front of the queue. In one embodiment, checking the status of the other process includes comparing a time at which a lock was granted to that process to a lock duration that may be identified in the entry associated with that process. If the process has held the lock for longer than the identified lock duration, then processing logic may determine that the process is no longer operational. In another embodiment, processing logic queries the other process. If processing logic does not receive a response from the other process, then processing logic may determine that the other process is not operational. In another embodiment, processing logic uses monitoring data about the other process that has been gathered by probes, agents and/or a monitor of a platform core. The monitoring data may identify a state of the other process.

At block 440, if the other process is still operational, the method returns to block 425. If the other process is operating correctly, then once it has completed any specified operations (e.g., read or write operations) on the resource, it will release the lock to the resource and remove its entry from the queue. A process associated with a next entry in the queue may then be granted a lock to the resource. However, if the other process is not operating correctly, then it may hold the lock indefinitely. Accordingly, if the other process is not operational, the method continues to block 445, and processing logic removes the other entry for the other process from the queue. At block 450, processing logic may then cause the other process to start a recovery procedure (e.g., to restart and recover its state). The method then returns to block 425. Processing logic may continue to return to block 425 until the process associated with the entry that processing logic added to the queue is at a front of the queue.

FIG. 5 is a flow diagram of one embodiment for a method 500 of managing a fault tolerant operational queue. The operational queue may be for an operation or procedure (e.g., for a cluster wide operation of procedure). The operation or procedure may be, for example, an operation that a distributed computing system indicates should be performed. Multiple processes running within the distributed computing system may then volunteer or commit to performing the operation. However, in many cases it is sufficient to have the operation performed just once by a single process (or performed some higher specified number of times by a specified number of processes). For example, the operation may be to create a new application that the distributed computing system has requested one of. In such an instance, it may be non-optimal for two processes to both create the same application. Another example of operations include operations for the collection and/or manipulation of performance data or logs (e.g., aggregating data, sorting data, compressing data, etc.). The operational queue may be used to determine which process (or processes) of multiple processes that commit to perform an operation actually performs the operation.

At block 505 of method 500, processing logic receives a commitment to perform an operation from a process. The operation may be a resource for a distributed computing system (e.g., for a cluster). The commitment to perform the operation may be received in response to processing logic identifying that the operation should be performed.

At block 510, processing logic determines whether a queue has already been created for the operation (for the resource). The queue may be an operational queue that enables a process at a front of the queue to perform the operation. The queue may already have been generated for the operation if another process previously committed to perform the operation. If there is a preexisting queue for the resource, the method proceeds to block 520. Otherwise, the method continues to block 515, and processing logic generates an operational queue for the resource.

At block 520, processing logic adds an entry to the operational queue for the process. The entry may be a token that includes a machine ID of a machine on which the process runs, a process ID of the process and/or a thread ID of a particular thread of the process that committed to perform the operation. The machine ID, process ID and/or thread ID may be used to generate a hash that uniquely identifies the process. The token may additionally include a timestamp and an operation duration. The timestamp identifies when the process committed to perform the operation and the operation duration identifies how long it will take for the process to complete the operation.

At block 525, processing logic determines whether the entry for the process is at a front of the operational queue. If the entry is at the front of the queue, the method continues to block 555, and processing logic instructs the process to perform the operation. If at block 525 the entry for the process is not at the front of the queue, the method continues to block 535. At block 535, processing logic determines whether another process associated with an entry at the front of the queue has completed the operation. If the other process has completed the operation, the method proceeds to block 560. Otherwise, the method continues to block 540. Once the operation is complete, processing logic deletes the operational queue at block 560.

At block 540, processing logic checks the status of the other process that is associated with another entry that is at the front of the queue. In one embodiment, checking the status of the other process includes comparing a time at which the operation was started by that process to an operation duration that may be identified in the entry associated with that process. If the process has been performing the operation for longer than the identified operation duration, then processing logic may determine that the process is no longer operational. In another embodiment, processing logic queries the other process. If processing logic does not receive a response from the other process, then processing logic may determine that the other process is not operational. In another embodiment, processing logic uses monitoring data about the other process that has been gathered by probes, agents and/or a monitor of a platform core. The monitoring data may identify a state of the other process. If the other process is still operational, the method returns to block 535. If the other process is not operating correctly, then it may not complete the operation. Accordingly, if the other process is not operational, the method continues to block 545, and processing logic removes the other entry for the other process from the queue. At block 550, processing logic may then cause the other process to start a recovery procedure (e.g., to restart and recover its state). The method then returns to block 525. This process may continue until the operation is completed.

Note that at block 555, a process may in some instances continue the operation from a point at which a previous process left off rather than starting the operation over. This may occur if a state of the operation has been preserved.

FIG. 6 is a flow diagram of one embodiment for a method 600 of failing over a queue. The queue may be a lock queue or an operational queue that is used to determine a process to assign a lock to or to assign an operation to. The queue may be associated with a particular resource, which may be a data resource or an operation resource. At block 605 of method 600, processing logic generates a primary copy of the queue. In one embodiment, the queue is maintained in a distributed database. Accordingly, the primary copy of the queue for the resource is added to the distributed database. At block 610, processing logic generates a backup copy of the queue for the resource. In one embodiment, the distributed database automatically generates backup copies of its contents (including the queue). At block 615, processing logic maintains a synchronization between the primary copy and the backup copy of the queue. The synchronization may be performed automatically by the distributed database. For example, when an entry is added to the primary copy of the queue, the same entry may be added to the backup copy of the queue. Accordingly, the multiple copies of the queue may be coherent and concurrent.

Processes may interact with the primary copy so long as the primary copy is accessible. At block 620, processing logic determines whether the primary copy of the queue is available. If the primary copy of the queue is available, the method ends. If the primary copy of the queue is not available, processing logic automatically fails over to a backup copy of the queue at block 625. This may cause the backup copy of the queue to become a new primary copy of the queue. Processing logic may fail over to the backup copy of the queue without any interruption in service to processes (e.g., to lock managers that use the queue).

Figure 7:
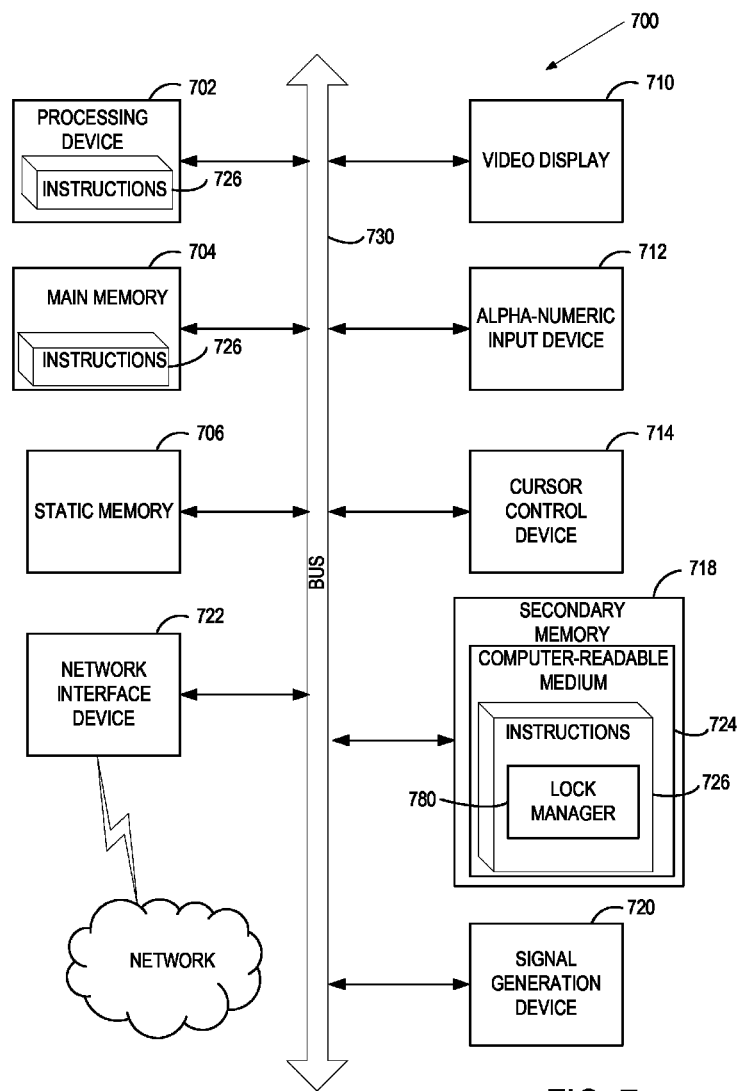
FIG. 7 illustrates a diagrammatic representation of a machine in the exemplary form of a computer system.

FIG. 7 is a diagram of one embodiment of a computer system for facilitating the execution of a web application in a cloud. Within the computer system 700 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host 110, 120 in a cloud 130, a cloud provider system 104, a cloud controller 108 or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a secondary memory 718 (e.g., a data storage device in the form of a drive unit, which may include fixed or removable computer-readable storage medium), which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the instructions 726 for performing the operations and steps discussed herein.

The computer system 700 may further include a network interface device 722. The computer system 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 718 may include a machine-readable storage medium (or more specifically a computer-readable storage medium) 724 on which is stored one or more sets of instructions 726 embodying any one or more of the methodologies or functions described herein. In one embodiment, the instructions 726 include instructions for a lock manager 780. The instructions 726 may also reside, completely or at least partially, within the main memory 704 and/or within the processing device 702 during execution thereof by the computer system 700, the main memory 704 and the processing device 702 also constituting machine-readable storage media.

The computer-readable storage medium 724 may also be used to store the instructions 726 persistently. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 726, components and other features described herein can be implemented as discrete hardware components or integrated in the functionality of hardware components such as ASICS, FPGAs, DSPs or similar devices. In addition, the instructions 726 can be implemented as firmware or functional circuitry within hardware devices. Further, the instructions 726 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. These quantities may take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "writing," "determining," "removing," "performing," "maintaining," "storing," "accessing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

I claim:

1. A method comprising:
   receiving a plurality of requests for a particular resource from a plurality of processes executed by a plurality of machines in a cluster;
   generating a queue for the particular resource in response to determining that a preexisting queue for the particular resource is not available;
   writing a plurality of entries to the queue, each of the plurality of entries corresponding to one of the plurality of processes;
   identifying, by a processing device executing a lock manager associated with the particular resource running on a machine of the plurality of machines in the cluster, a first entry of the plurality of entries that is at a front of the queue;
   determining, by the processing device executing the lock manager, whether a first process associated with the first entry is operational, wherein the first process is one of the plurality of processes; and
   responsive to determining that the first process is not operational, performing the following by the processing device executing the lock manager comprising:
   removing the first entry from the queue;
   revoking a lock for the resource from the first process while the first process is not operational;
   granting the revoked lock for the resource to a second process of the plurality of processes that corresponds to a second entry of the plurality of entries of the queue;
   maintaining a primary copy of the queue and multiple backup copies of the queue that are synchronized with the primary copy of the queue, wherein the backup copies of the queue are hosted in the plurality of machines in the cluster; and
   in response to determining that the primary copy of the queue is unavailable, failing over to a first backup copy of the backup copies of the queue by electing the first backup copy as the primary copy of the queue.

2. The method of claim 1, further comprising:
   performing an action associated with the particular resource by the second process in response to determining that the second entry of the plurality of entries that is associated with the second process has moved to the front of the queue.

3. The method of claim 2, wherein the particular resource comprises data, and wherein the action is a lock on the data.

4. The method of claim 2, wherein the particular resource is an operation, and wherein the action is execution of the operation.

5. The method of claim 1, wherein determining whether the first process is operational comprises determining whether a time limit identified in the first entry has lapsed.

6. The method of claim 1, wherein the machine is a node in a distributed system and wherein the first process runs on another node in the distributed system.

7. A non-transitory computer readable storage medium having instructions that, when executed by a processing device, cause the processing device to:
   receive one or more requests for a particular resource from one or more processes executed by a plurality of machines in a cluster;
   generate a queue for the particular resource in response to determining that a preexisting queue for the particular resource is not available;
   write one or more entries to the queue for the one or more processes by the processing device executing a lock manager, wherein the queue has a plurality of entries, each of the plurality of entries corresponding to a different process;
   identify, by the processing device executing the lock manager associated with the particular resource running on a machine of the plurality of machines, a first entry of the plurality of entries that is at a front of the queue;
   determine, by the processing device executing the lock manager, whether a first process associated with the first entry is operational, wherein the first process is one of the plurality of processes; and
   responsive to determining that the first process is not operational, perform the following by the processing device executing the lock manager comprising:
   removing the first entry from the queue;
   revoking a lock for the resource from the first process while the first process is not operational;
   granting the revoked lock for the resource to a second process of the plurality of processes that corresponds to a second entry of the plurality of entries of the queue;
   maintaining a primary copy of the queue and multiple backup copies of the queue that are synchronized with the primary copy of the queue, wherein the backup copies of the queue are hosted in the plurality of machines in the cluster; and in response to determining that the primary copy of the queue is unavailable, failing over to a first backup copy of the backup copies of the queue by electing the first backup copy as the primary copy of the queue.

8. The non-transitory computer readable medium of claim 7, wherein the processing device is further to:

perform an action associated with the particular resource by the second process in response to determining that the second entry of the plurality of entries that is associated with the second process has moved to the front of the queue.

9. The non-transitory computer readable medium of claim 8, wherein the particular resource comprises data, and wherein the action is a lock on the data.

10. The non-transitory computer readable medium of claim 8, wherein the particular resource is an operation, and wherein the action is execution of the operation.

11. The non-transitory computer readable medium of claim 7, wherein the processing device is further to determine whether the first process is operational by determining whether a time limit identified in the first entry has lapsed.

12. The non-transitory computer readable medium of claim 7, wherein the machine is a node in a distributed system and wherein the first process runs on another node in the distributed system.

13. A computing device comprising:

a memory to store instructions for a lock manager; and a processing device coupled to the memory, wherein the processing device is to:

receive a plurality of requests for a particular resource from a plurality of processes executed by a plurality of machines in a cluster, wherein the lock manager is associated with the particular resource;

generate a queue for the particular resource in response to determining that a preexisting queue for the particular resource is not available;

write a plurality of entries to the queue, each of the plurality of entries corresponding to one of the plurality of processes;

identify a first entry of the plurality of entries that is at a front of the queue;

determine whether a first process associated with the first entry is operational, wherein the first process is one of the plurality of processes; and responsive to a determination that the first process is not operational, perform the following comprising:

remove the first entry from the queue;

revoke a lock for the resource from the first process while the first process is not operational;

grant the revoked lock for the resource to a second process of the plurality of processes that corresponds to a second entry of the plurality of entries of the queue;

maintain a primary copy of the queue and multiple backup copies of the queue that are synchronized with the primary copy of the queue, wherein the backup copies of the queue are hosted in the plurality of machines in the cluster; and in response to determining that the primary copy of the queue is unavailable, fail over to a first backup copy of the backup copies of the queue by electing the first backup copy as the primary copy of the queue.

14. The computing device of claim 13, wherein the processing device is further to perform an action associated with the particular resource for the second process in response to determining that the second entry of the plurality of entries that is associated with the second process has moved to the front of the queue.

15. The computing device of claim 14, wherein the particular resource comprises data, and wherein the action is a lock on the data.

16. The computing device of claim 14, wherein the particular resource is an operation, and wherein the action is execution of the operation.

17. The computing device of claim 13, wherein the processing device is further to determine whether the first process is operational by determining whether a time limit identified in the first entry has lapsed.

18. The computing device of claim 13, wherein the computing device is a node in a distributed system and wherein the first process runs on another node in the distributed system.

* * * * *